(12) United States Patent
Yamasaki (10) Patent No.: US 8,254,042 B2
(45) Date of Patent: Aug. 28, 2012

(54) IMAGING APPARATUS

(75) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 12/895,455

(22) Filed: Sep. 30, 2010

(65) Prior Publication Data

US 2011/0080648 A1    Apr. 7, 2011

(30) Foreign Application Priority Data

Oct. 6, 2009    (JP) .................................. 2009-232224

(51) Int. Cl.
*G02B 27/00*    (2006.01)

(52) U.S. Cl. ........................................ 359/808; 359/754

(58) Field of Classification Search .......... 359/754–797, 359/808
See application file for complete search history.

(56) References Cited

U.S. PATENT DOCUMENTS

| 7,796,342 B2 * | 9/2010 | Baba .............................. 359/648 |
| 2005/0285972 A1 | 12/2005 | Saiki |
| 2007/0292121 A1 | 12/2007 | Sato |

FOREIGN PATENT DOCUMENTS

JP    2008-172423 A    7/2008

* cited by examiner

*Primary Examiner* — Darryl J Collins
(74) *Attorney, Agent, or Firm* — Canon U.S.A., Inc. IP Division (57) ABSTRACT

An imaging apparatus includes an imaging system, a dome cover that houses the imaging system, and a correction lens between the imaging system and the dome cover. The focal length of the dome cover and the focal length of the correction lens are appropriately set based on predetermined conditions.

5 Claims, 5 Drawing Sheets

IMAGING APPARATUS

BACKGROUND OF THE INVENTION

1. Field of the Invention

The present invention relates to an imaging apparatus having an imaging system to which a hemispherical dome cover can be attached.

2. Description of the Related Art

Many surveillance cameras have an imaging system enclosed in a hemispherical dome cover attached thereto. The use of a dome cover in a surveillance camera protects the imaging system and prevents unauthorized users from determining the imaging direction of the camera. The dome cover, however, has a concentric shape and a thickness of several millimeters which may deteriorate the imaging capacity of the imaging system. In other words, the dome cover itself has a lens action (optical action), and therefore attaching the dome cover to an imaging apparatus changes the optical characteristics of such apparatus. More specifically, attaching a dome cover having a lens effect to an imaging system significantly changes the focal length and the focus position of the entire system. The change in the focal length of the entire system incidentally changes the photographing angle of view of the imaging system. For this reason, in an imaging apparatus having an imaging system to which a dome cover can be attached, it is important to reduce not only the change in focus but also the change in optical performance including the change in focal length caused by attaching the dome cover. The amount of change in focal length (defocus) caused by attaching the dome cover varies significantly depending on the relationship between the focal length of the dome cover itself and the focal length of the imaging system. Defocusing issues of type described above have been previously considered, and imaging apparatuses are known in which such defocus is corrected.

A lens apparatus described in U.S. patent application publication US 2007/0292121 prevents defocus by performing focus adjustment of an imaging system with a member attached that has the same optical characteristics as a case member, and removing the member and attaching the case member. A monitoring camera described in Japanese Patent Application Laid-Open No. 2008-172423 controls the amount of defocus of a focus lens on the basis of information on a case member and information on an imaging optical system. An imaging apparatus disclosed by U.S. patent application publication US 2005/0285972 has a cylindrical window section in front of a lens and corrects the difference in focal length due to the difference in refractive power between the vertical direction and the horizontal direction of the window section. More specifically, in US 2005/0285972, a correction plate cylindrically bent in the direction perpendicular to the bending direction of the window section and having the same bending radius as the window section is disposed between the window section and the lens. In other words, a sampling of the known imaging apparatuses having a dome-shaped cover reveals that these apparatus namely address defocusing conditions.

However, in the case where the imaging system has a zooming function like a zoom lens or a varifocal lens, the amount of change in focal length caused by attaching the dome cover differs significantly between the wide-angle end and the telephoto end. Therefore, the zoom ratio of the entire system including the dome cover is significantly changed by attaching the dome cover, and the optical specification is significantly changed. In addition, if the defocus caused by attaching the dome cover is adjusted by moving a focus lens group, the range of a focusable object distance is changed. Further, aberrations (spherical aberration, coma aberration, astigmatism, field curvature, distortion, chromatic aberration of magnification, axial chromatic aberration) of the imaging system are also changed by attaching the dome cover. Accordingly, there is a need in the state of the art for dome-covered imaging apparatuses that can adequately address changes in zooming and minimize aberrations.

SUMMARY OF THE INVENTION

Embodiments of the present invention describe an imaging apparatus that includes a dome cover and can perform optimal imaging when an imaging system is housed in the dome cover.

In an aspect of the present invention, an imaging apparatus includes an imaging system, a dome cover that houses the imaging system, and a correction lens between the imaging system and the dome cover. The following condition is satisfied:

$$-1.10 < fdo/fcp < -0.90,$$

where fdo is the focal length of the dome cover, and fcp is the focal length of the correction lens.

In another aspect of the present invention, an imaging apparatus includes an imaging system, and a correction lens or a dome cover attached to the imaging system on an object side thereof. The imaging system can perform zooming from a wide-angle end to a telephoto end, and the following conditions are satisfied:

$$-100 < fcn/OAL < -50,$$

$$-50 < fcn/\sqrt{(fw^*ft)} < -20, \text{ and}$$

$$0.33 < \phi rc1/RC1 < 0.89,$$

where fcn is the focal length of the correction lens, RC1 and ϕrc1 are respectively the curvature radius and the light transmission effective diameter of the object-side surface of the correction lens, fw and ft are respectively the focal lengths at the wide-angle end and the telephoto end of the imaging system, and OAL is the total length of the imaging system.

Further features of the present invention will become apparent to persons having ordinary skill in the art from the following description of exemplary embodiments with reference to the attached drawings.

DESCRIPTION OF THE EMBODIMENTS

The imaging apparatus of the present invention is characterized in that the change in optical characteristics caused by housing an imaging system (a photographing lens of a fixed focal length or an imaging lens having a zoom function) in a dome cover is reduced using a correction lens. In an imaging apparatus of a first embodiment, a correction lens is disposed between an imaging system and a dome cover when the dome cover is attached. On the other hand, in an imaging apparatus of a second embodiment, a correction lens is attached when a dome cover is not attached, and the correction lens is removed when the dome cover is attached.

Figure 1:
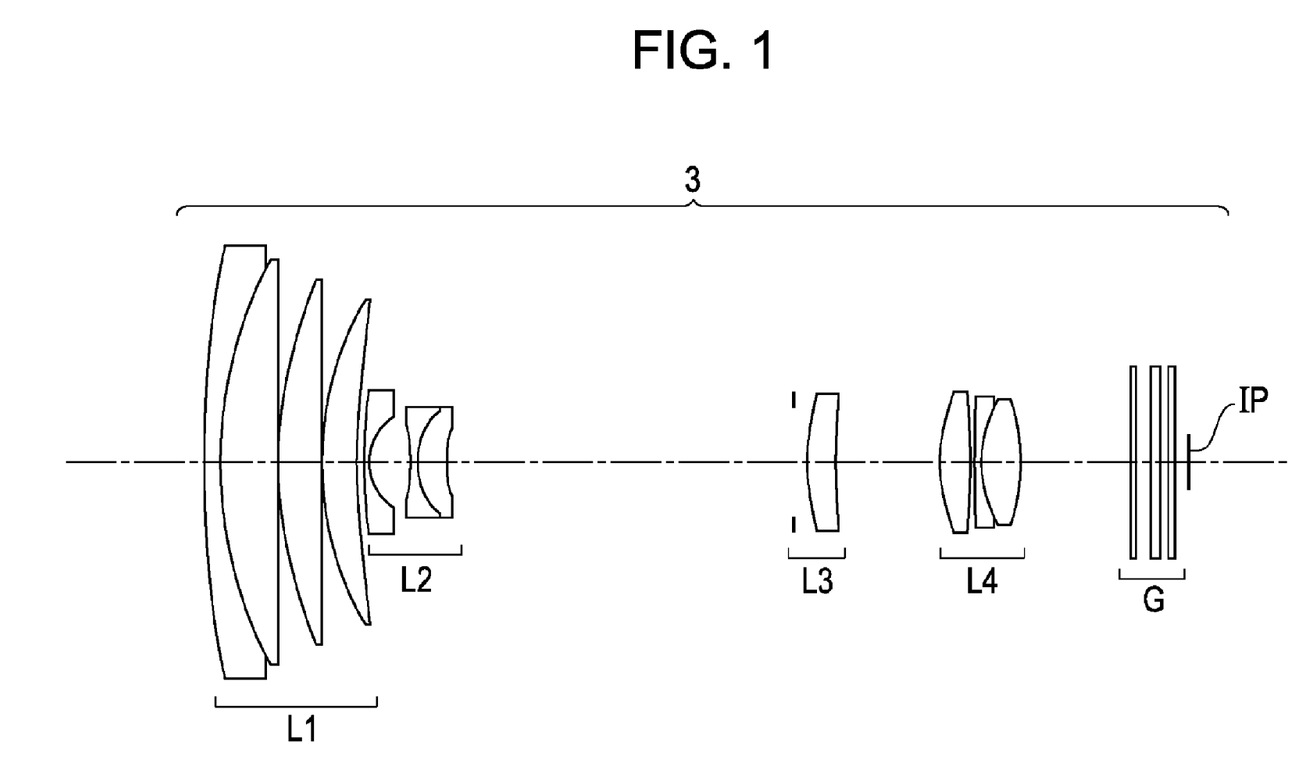
FIG. 1 is a lens sectional view of an imaging system used in a first embodiment of the present invention.
Figure 2:
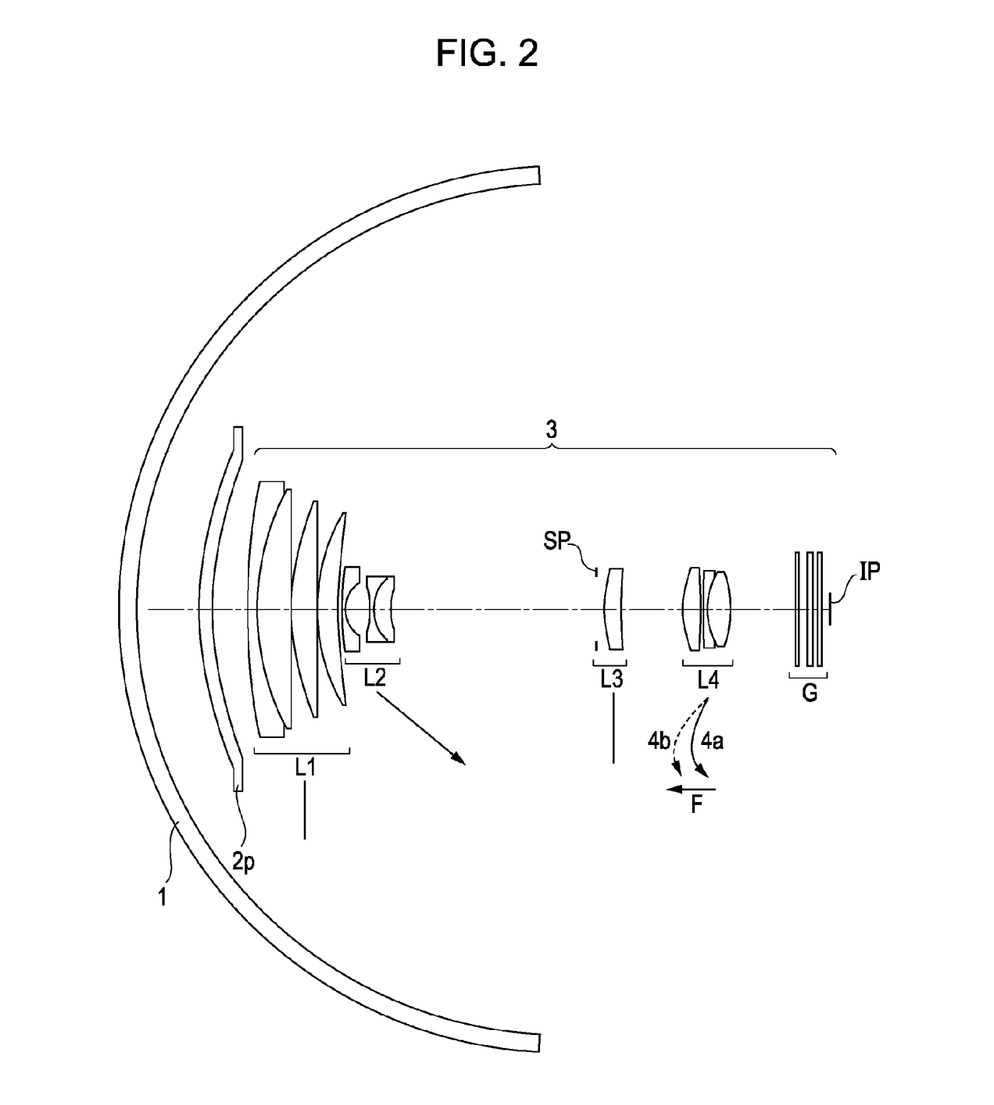
FIG. 2 is a sectional view of relevant parts of an imaging apparatus of the first embodiment of the present invention.
Figure 3:
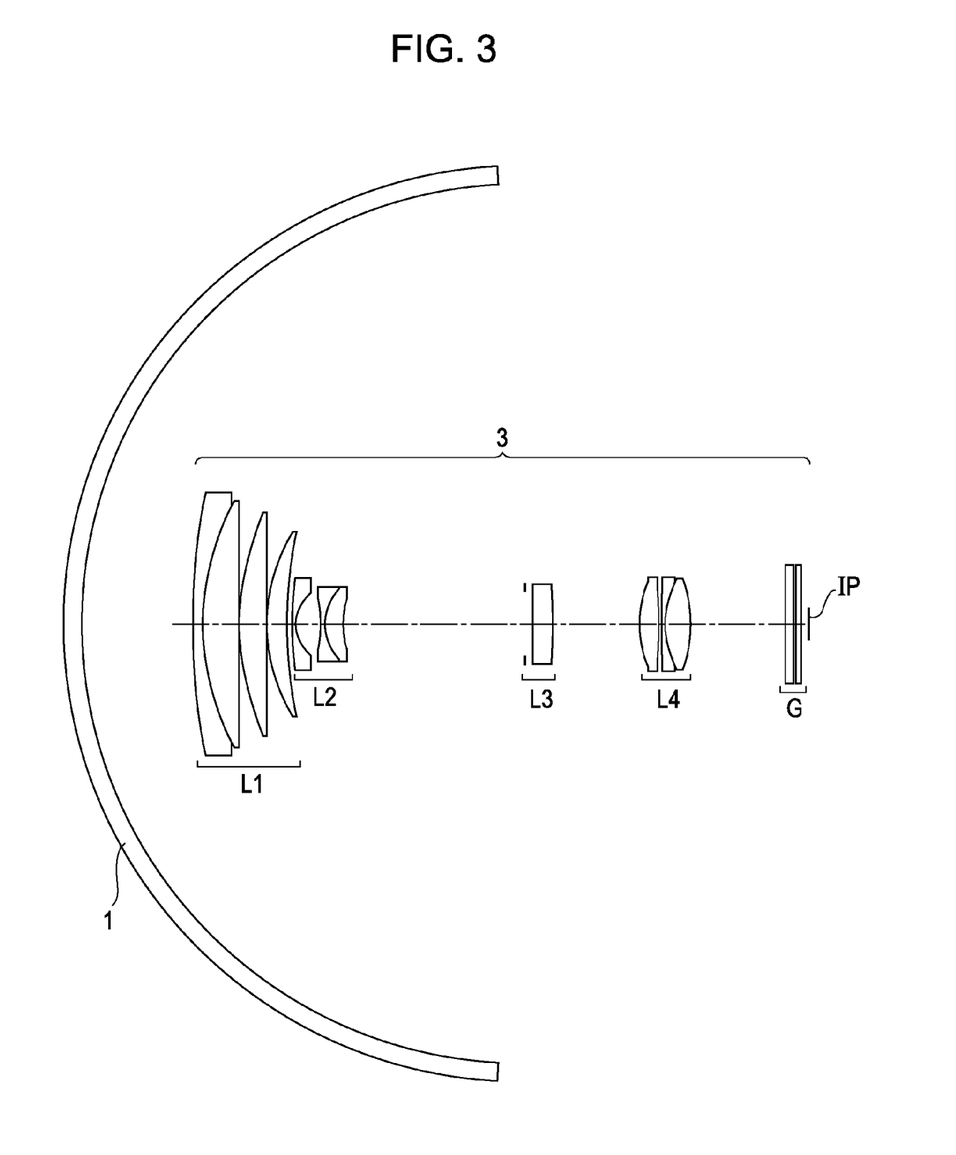
FIG. 3 is a sectional view of relevant parts of an imaging apparatus of a second embodiment of the present invention.
Figure 4:
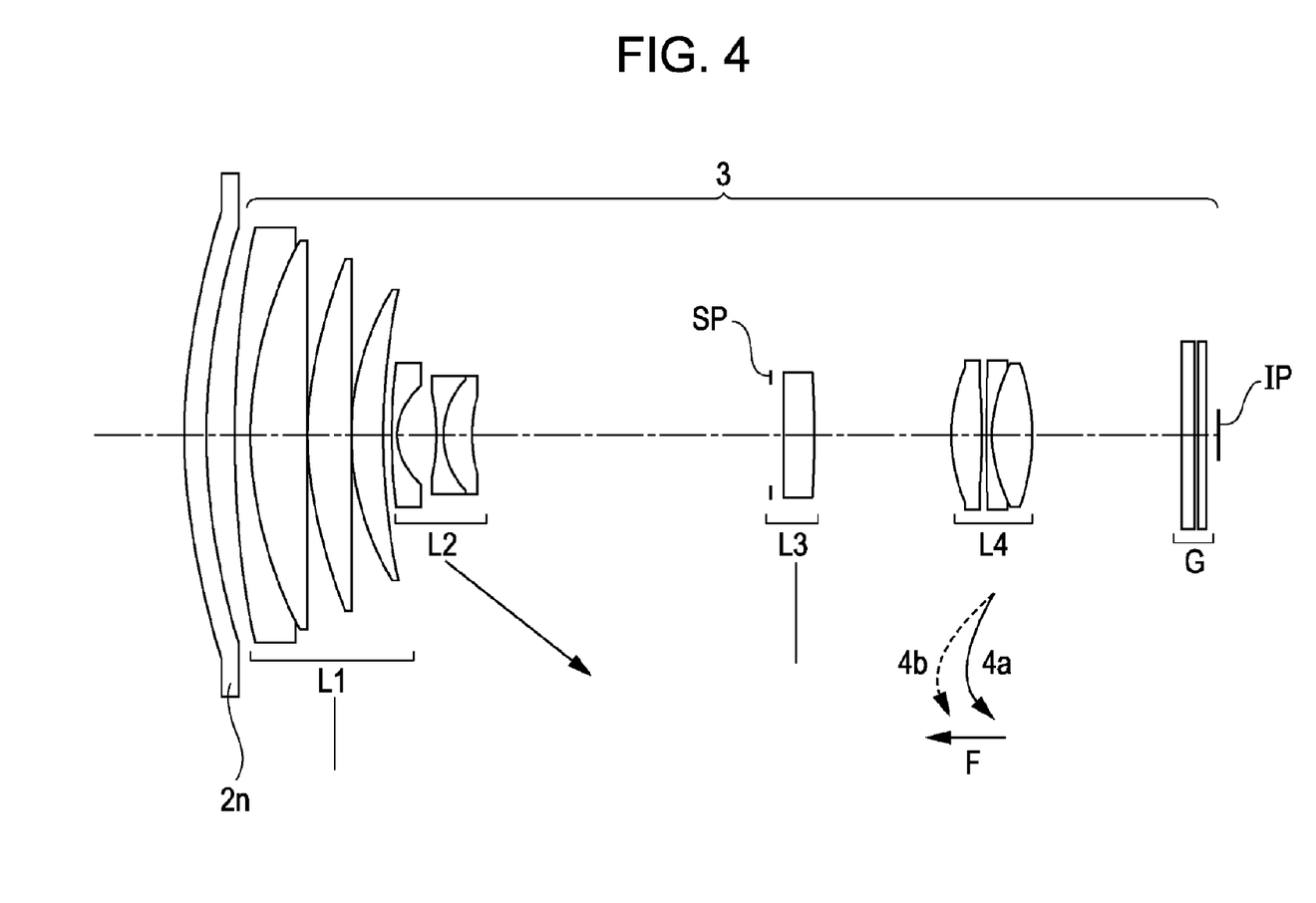
FIG. 4 is a lens sectional view of an imaging system used in the second embodiment of the present invention.
Figure 5:
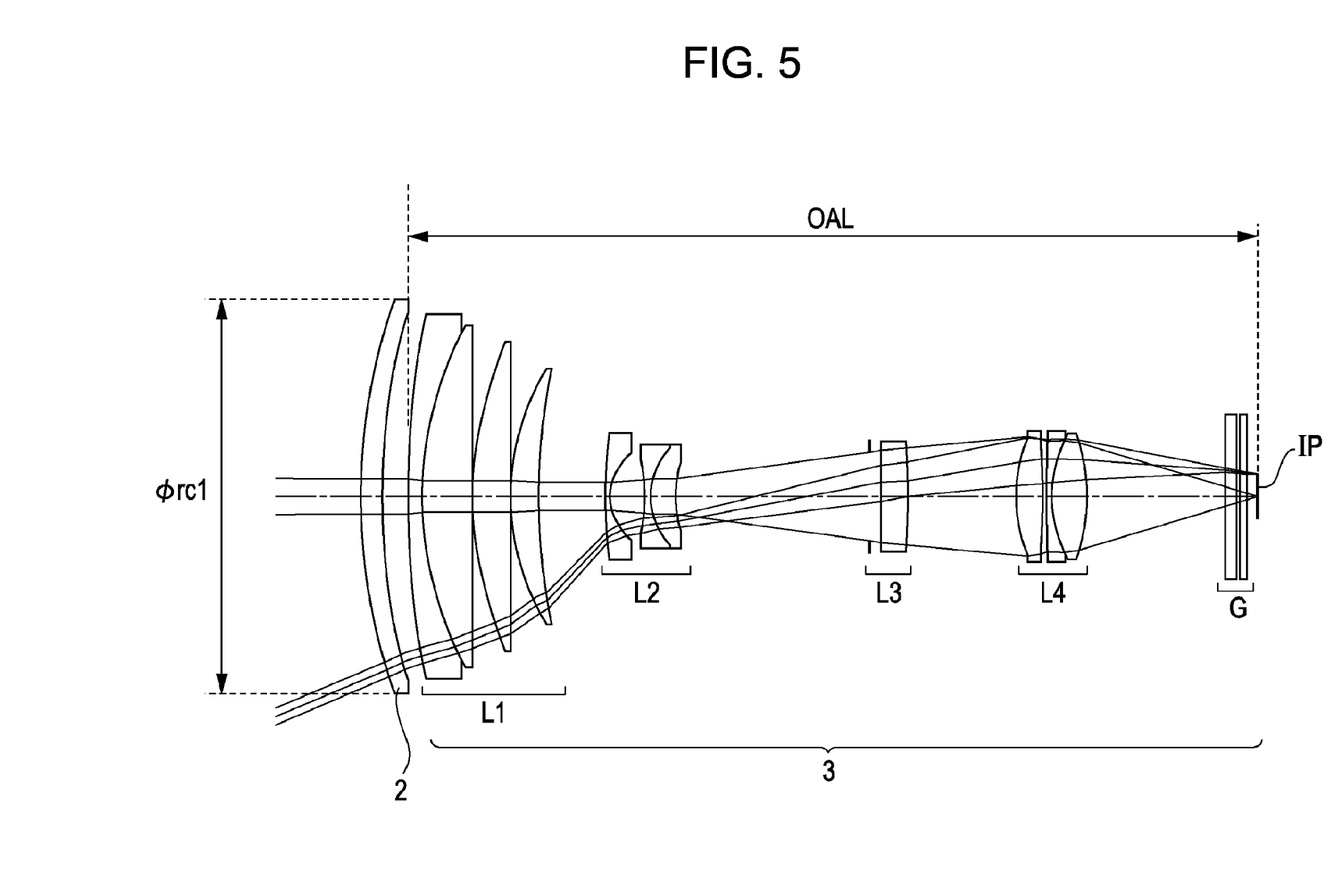
FIG. 5 is an explanatory view of the lens configuration of the imaging system of the present invention.

FIG. 1 is a lens sectional view at the wide-angle end of a zoom lens (imaging system) used in the first embodiment of the present invention. FIG. 2 is a sectional view in a state where a dome cover is attached to the imaging system of the first embodiment and a correction lens is disposed between the imaging system and the dome cover. FIG. 3 is a sectional view of relevant parts of the imaging apparatus of the second embodiment of the present invention in a state where a dome cover is attached to an imaging system. FIG. 4 is a lens sectional view in a state where a correction lens is disposed on the object side of a zoom lens (imaging system) used in the second embodiment of the present invention and the dome cover is removed. FIG. 5 is an explanatory view of the lens configuration of the imaging system (zoom lens) of the present invention. The dome cover 1 has a concentric and substantially hemispherical shape. The curvature radius on the object side is larger than the curvature radius on the image side, and therefore the dome cover 1 has negative refractive power. Accordingly, in the imaging apparatus of the first embodiment of the present invention, a correction lens $2p$ of positive refractive power is disposed between the imaging system (main lens system) 3 and the dome cover 1. In the imaging apparatus of the second embodiment, a correction lens $2n$ of negative refractive power is attached on the object side of the imaging system 3 when the dome cover 1 is removed. As used herein, the side of a lens where an object to be imaged is placed is referred to as the object side or front side of the lens; and the side of the lens where the image is formed is referred to as the image side or back side of the lens.

Next, the lens configuration of a zoom lens as an example of the imaging system 3 will be described. In the lens sectional views, as seen from the object side to the image side (left to right in the drawings), L1 denotes a first lens group of positive refractive power, L2 denotes a second group unit of negative refractive power, L3 denotes a third lens group of positive refractive power, and L4 denotes a fourth lens group of positive refractive power. SP denotes an aperture stop, which is located on the object side of the third lens group L3. G denotes an optical block corresponding, for example, to an optical filter or a face plate. IP denotes an image plane. When the zoom lens is used as a photographing optical system of a video camera or a digital camera, the image plane IP corresponds to an imaging plane of a solid-state imaging element (photoelectric conversion element) such as a CCD sensor or a CMOS sensor. When the zoom lens is used as a photographing optical system of a silver-halide film camera, the image plane IP corresponds to a film plane. In the following embodiments, the terms "wide-angle end" and "telephoto end" refer to zoom positions where the lens group for magnification variation (second lens group L2) is located at either end of its mechanically movable range on the optical axis.

During zooming from the wide-angle end to the telephoto end, the imaging system 3 moves the second lens group L2 to the image side to perform magnification variation and moves the fourth lens group L4 in a locus convex path toward the object side to correct the image plane variation accompanying magnification variation. The zoom lens is of a rear focus type in which the fourth lens group L4 is moved on the optical axis to perform focusing. The solid curve 4a and dashed curve 4b concerning the fourth lens group L4 are moving loci for correcting the image plane variation accompanying magnification variation during focusing on an object at infinity and an object at a close distance, respectively. In the case of focusing from an object at infinity to an object at a close distance, the focus group is moved forward as shown by the arrow F. The imaging system 3 is not limited to a zoom lens and may be a photographing lens of a fixed focal length.

In the first embodiment, when the dome cover 1 is not attached to the imaging system 3, as shown in FIG. 1, the correction lens $2p$ is not attached to the imaging system 3. When the dome cover 1 is attached to the imaging system 3, as shown in FIG. 2, the correction lens $2p$ is disposed between the dome cover 1 and the imaging system 3. In the first embodiment, the dome cover 1 has negative refractive power, and the correction lens $2p$ has positive refractive power. The focal length of the dome cover 1 is denoted by fdo, and the focal length of the correction lens $2p$ is denoted by fcp, a ratio fdo to fcp should preferably range between −1.10 to −0.90. In other words, the following condition is satisfied:

$$-1.10 < fdo/fcp < -0.90 \tag{1}$$

In the first embodiment, the correction lens $2p$ is a positive meniscus lens convex toward the object side. The curvature radii of the object-side and image-plane-side surfaces of the dome cover 1 are denoted by RD1 and RD2, respectively. The curvature radii of the object-side and image-plane-side surfaces of the correction lens $2p$ are denoted by RC1 and RC2, respectively. The following condition is satisfied:

$$-10.0 < (RD1-RD2)/(RC1-RC2) < -2.0 \tag{2}$$

The correction lens $2p$ is disposed between the imaging system 3 and the dome cover 1 in order to reduce the deterioration of optical characteristics due to the optical action of the dome cover 1. When the conditional expression (1) is satisfied, the correction lens $2p$ has appropriate power (reciprocal of focal length). If the ratio between the power of the dome cover 1 and the power of the correction lens $2p$ does not satisfy the conditional expression (1), the power of the correction lens $2p$ is too strong or too weak to perform appropriate correction. It is more preferable that the numerical range of the conditional expression (1) be as follows:

$$-1.08 < fdo/fcp < -0.95 \tag{1a}$$

The conditional expression (2) defines the shapes of the dome cover 1 and the correction lens $2p$. The dome cover 1 acts as a negative meniscus lens convex toward the object side. The conditional expression (2) shows that the correction lens $2p$ is a positive meniscus lens convex toward the object side. When the conditional expression (2) is satisfied, the correction lens $2p$ has curvature close to concentric with the center of curvature of each surface of the dome cover 1. Thus, the correction lens $2p$ can not only simply correct the power but also correct the optical performance from on-axis to off-axis (e.g., field curvature and astigmatism). It is more preferable that the numerical range of the conditional expression (2) be as follows:

$$-7.0 < (RD1-RD2)/(RC1-RC2) < -3.5 \tag{2a}$$

In the second embodiment, when the dome cover 1 is not attached to the imaging system 3, as shown in FIG. 4, the correction lens $2n$ is attached to the imaging system 3. When the dome cover 1 is attached to the imaging system 3, as shown in FIG. 3, the correction lens $2n$ is removed.

In the second embodiment, the correction lens $2n$ is configured such that the optical performance of the imaging apparatus after the attachment of the dome cover 1 to the imaging system 3 is the same as that before the attachment of the dome cover 1 to the imaging system 3. The correction lens $2n$ has negative refractive power like the dome cover 1. In the second embodiment, the focal length of the correction lens $2n$ is denoted by fcn, and the curvature radius and the light transmission effective diameter of the object-side surface of the correction lens $2n$ are denoted by RC1 and φrc1, respectively. The focal lengths at the wide-angle end and the telephoto end of the imaging system 3 are denoted by fw and ft, respectively. The total length of the imaging system 3 is denoted by OAL. The following conditions are satisfied:

$$-100 < fcn/OAL < -50 \quad (3),$$

$$-50 < fcn/\sqrt{(fw*ft)} < -20 \quad (4), \text{ and}$$

$$0.33 < \phi rc1/RC1 < 0.89 \quad (5).$$

The total length OAL of the imaging system is the distance from the first lens surface to the image plane IP of the imaging system 3 as shown in FIG. 5. The total length OAL is calculated using the optical path length of the optical member G disposed between the final lens surface and the image plane. The light transmission effective diameter φrc1 of the correction lens $2n$ is, as shown in FIG. 5, a range in which off-axis beams pass through the object-side surface of the correction lens $2n$ throughout the zoom range of the imaging system 3.

The conditional expressions (3) to (5) define the lens configuration of the correction lens $2n$. If the conditional expressions (3) and (4) are not satisfied, the power of the correction lens $2n$ is too strong or too weak to perform appropriate correction. The conditional expression (5) is connected with the effective diameter of the object-side surface of the correction lens $2n$. If φrc1/RC1 is less than the lower limit value, shading occurs. If φrc1/RC1 is greater than the upper limit value, the effective diameter of the correction lens $2n$ is too large, and therefore the size cannot be sufficiently reduced when the dome cover 1 is removed. It is more preferable that the numerical ranges of the conditional expressions (3) to (5) be as follows:

$$-85 < fcn/OAL < -65 \quad (3a),$$

$$-45 < fcn/\sqrt{(fw*ft)} < -25 \quad (4a), \text{ and}$$

$$0.5 < \phi rc1/RC1 < 0.7 \quad (5a).$$

When the focal length of the dome cover attached to the imaging system in the second embodiment is denoted by fdo, the following condition is preferably satisfied:

$$0.90 < fdo/fcn < 1.10 \quad (6).$$

In this case, good optical performance can be easily obtained when the dome cover 1 is attached to the imaging system 3. According to each embodiment, the change in zoom ratio, the change in focusable object distance, and the change in optical performance caused by attaching the dome cover 1 to the imaging system 3 can be appropriately corrected by using the correction lens 2. In each embodiment, it is recommended that the correction lens 2 and the dome cover 1 be made of the same (identical) material. By making the correction lens 2 and the dome cover 1 of the same (identical) material, variations in refractive index and curvature due to temperature change can be reduced. However, if the dome cover 1 and the correction lens 2 can be made of materials that have linear expansion coefficients close to each other, they do not necessarily have to be made of the same material. The dome cover 1 is mainly made of a transparent resin material. It is recommended that the dome cover 1 be made of acrylic resin, polycarbonate resin, polyethylene resin, polyolefin resin, polystyrene resin, or the like in accordance with the intended use. It is recommended that the correction lens 2 be also made of one of these materials in accordance with the intended use.

It is recommended that the correction lens 2 of each embodiment have a unit (or section thereof) that performs selective adjustment of transmission wavelength. This is a configuration especially suitable for outdoor use as a monitoring camera. For example, if sunlight appears on the monitoring camera screen, the amount of heat generation increases near the stop, the surrounding lens barrel member is thermally deformed, and optical characteristics change. If the correction lens 2 has a unit that performs selective adjustment of transmission wavelength, the change in optical characteristics can be reduced. In each embodiment, according to the situation, the correction lens has a role corresponding to a heat-ray absorbing filter for preventing transmission of heat rays (infrared rays). The correction lens 2 itself may be made of a glass material having a heat-ray absorbing characteristic, or the correction lens 2 may be provided with a coating having a heat-ray reflecting characteristic. It is recommended that the transmittance satisfy, for example, the following conditions:

$$T750 < 60\%,$$

$$T800 < 30\%, \text{ and}$$

$$T900 < 10\%,$$

where T750, T800, and T900 are transmittances at wavelengths of 750 nm, 800 nm, and 900 nm, respectively. Such an optical material is a material that absorbs heat-rays like HA30 or HA50 (both made by HOYA CORPORATION). It is recommended that at least one surface of the correction lens 2 be aspherical. In this case, the surface accuracy due to formability of the dome cover 1 and the change in optical characteristics due to attachment or removal of the dome cover 1 can be effectively corrected using the aspherical coefficients without changing the power of the correction lens 2.

Next, the following are Numerical Embodiments 1 to 6 corresponding to each embodiment. In each numerical embodiment, numbers (i) denote the order of surfaces from the object side. Ri denotes the curvature radius of the i-th surface, and di denotes the distance between the i-th surface and the (i+1)th surface. Ni and vi respectively denote the refractive index and the Abbe number for the d-line. In Numerical Embodiments 1 to 4, the six surfaces on the most image side are planes corresponding to the optical block G. In Numerical Embodiments 5 and 6, the five surfaces closest to the image side are planes corresponding to a dummy surface and the optical block G. The letters k, B, C, D, and E denote aspherical coefficients. An aspherical shape is defined by the following expression:

$$x = (h^2/R)/[1 + \{1-(1+k)(h/R)^2\}^{1/2}] + Bh^4 + Ch^6 + Dh^8 + Eh^{10},$$

where x is an amount of displacement from a surface vertex in the optical axis direction at a height h from the optical axis. R is a paraxial curvature radius. For example, "E-Z" means "$10^{-Z}$." The relationship between the above-described conditional expressions and Numerical Embodiments is shown in Table 6.

Next, numerical embodiments of each embodiment will be described. Numerical Embodiments 1 to 4 correspond to the first embodiment. Numerical Embodiments 1 to 4 have a common imaging system 3 and different dome covers 1 and correction lenses 2. In each numerical embodiment, the focal length and the magnification (zoom ratio) in each of the case of the imaging system 3 alone, the case of the imaging system 3 and the dome cover 1, and the case of the imaging system 3, the correction lens 2, and the dome cover 1 are shown. For example, in Numerical Embodiment 1, in the case of the imaging system 3 alone, the focal lengths at the wide-angle end and the telephoto end are 3.40 mm and 134.48 mm, respectively, and the zoom ratio is 39.55. In the case where the dome cover 1 is attached to the imaging system 3, the focal lengths at the wide-angle end and the telephoto end are 3.42 mm and 113.79 mm, respectively, and the zoom ratio is 33.27. In other words, by attaching the dome cover 1 to the imaging system 3, the focal length at the telephoto end is significantly affected, and the zoom ratio is significantly reduced.

In consideration of the above-described variations, in Numerical Embodiment 1, by using the correction lens 2, the focal length at the telephoto end is corrected to 137.70 mm, and the focal length and the zoom ratio can be brought close to those in the case of the imaging system 3 alone. In addition, adjustment of defocus due to attaching the dome cover 1 can be omitted. Numerical Embodiments 5 and 6 correspond to the second embodiment. Numerical Embodiments 5 and 6 have a common imaging system 3 and different dome covers 1 and correction lenses 2. In each numerical embodiment, the focal length in each of the case of the imaging system 3 alone, the case of the imaging system 3 and the dome cover 1, and the case of the imaging system 3 and the correction lens 2 is shown. For example, in Numerical Embodiment 5, in the case of the imaging system 3 and the correction lens 2, the combined focal length at the telephoto end is 123.01. In the case of the imaging system 3 alone, the focal length is 165.67. When the imaging system 3 is housed in the dome cover 1, the correction lens 2 is removed. In this state, the combined focal length at the telephoto end of the dome cover 1 and the imaging system 3 is 123.00. By using the correction lens 2, imaging conditions in the state where the dome cover 1 is not attached (FIG. 4) are made the same as those in the state where the dome cover 1 is attached (FIG. 3).

As described above, according to each embodiment, the change in optical characteristics such as focal length due to the attachment of the dome cover can be reduced.

TABLE 1

Numerical Embodiment 1

| | i | Ri | di | Ni | νi |
|---|---|---|---|---|---|
| Dome cover (D) | 1 | 66.2 | 2.00 | 1.492 | 58 |
| | 2 | 64.2 | 6.40 | | |
| Correction lens (C) | 3 | 57.8 | 2.00 | 1.51633 | 64.1 |
| | 4 | 58.2 | 5.00 | | |
| Main lens | 5 | 99.207 | 1.70 | 1.80518 | 25.4 |
| | 6 | 41.142 | 5.45 | 1.48749 | 70.2 |
| | 7 | −325.945 | 0.17 | | |
| | 8 | 43.541 | 3.40 | 1.48749 | 70.2 |
| | 9 | 298.330 | 0.17 | | |
| | 10 | 26.891 | 3.25 | 1.60311 | 60.6 |
| | 11 | 65.488 | (variable) | | |
| | 12 | 50.090 | 0.70 | 2.00060 | 25.5 |
| | 13 | 5.971 | 3.51 | | |
| | 14 | −17.285 | 0.60 | 1.58313 | 59.4 |
| | 15 | 7.690 | 2.80 | 1.92286 | 18.9 |
| | 16 | 43.001 | (variable) | | |
| | 17 | (stop) | 1.30 | | |
| | 18* | 22.573 | 2.70 | 1.58313 | 59.4 |
| | 19* | 215.489 | (variable) | | |
| | 20* | 15.337 | 2.70 | 1.58313 | 59.4 |
| | 21* | −53.052 | 0.33 | | |
| | 22 | 123.556 | 0.60 | 1.84666 | 23.8 |
| | 23 | 11.628 | 3.60 | 1.51742 | 52.4 |
| | 24 | −15.274 | (variable) | | |
| | 25 | ∞ | 0.30 | 1.51400 | 70.0 |
| | 26 | ∞ | 1.51 | | |
| | 27 | ∞ | 0.80 | 1.54400 | 60.0 |
| | 28 | ∞ | 0.60 | | |
| | 29 | ∞ | 0.75 | 1.49000 | 70.0 |
| | 30 | ∞ | | | |

Aspherical Coefficient

| | k | B | C | D | E |
|---|---|---|---|---|---|
| 18* | 7.355E−02 | −8.726E−05 | 0.000E+00 | 0.000E+00 | 0.000E+00 |
| 19* | 7.226E+02 | −6.549E−05 | 4.120E−07 | 0.000E+00 | 0.000E+00 |
| 20* | −1.294E+00 | −4.795E−05 | 1.775E−07 | 2.179E−09 | −3.479E−11 |
| 21* | −3.432E+01 | 3.512E−06 | 0.000E+00 | 0.000E+00 | 0.000E+00 |

Focal length

| | Wide-angle | Middle | Telephoto | Magnification |
|---|---|---|---|---|
| Main lens alone | 3.40 | 34.67 | 134.48 | 39.55 |
| (Main lens) + (Dome cover) | 3.42 | 34.29 | 113.79 | 33.27 |
| (Main lens) + (Dome cover) + (Correction lens) | 3.48 | 35.38 | 137.70 | 39.57 |

TABLE 2

Common (Main lens alone)

|  | Wide-angle | Middle | Telephoto |
|---|---|---|---|
| F number | 1.65 | 2.24 | 5.13 |
| Image height | 2.25 | 2.25 | 2.25 |
| d11 | 0.52 | 23.56 | 29.32 |
| d16 | 30.50 | 7.46 | 1.70 |
| d19 | 9.06 | 3.30 | 17.61 |
| d24 | 9.94 | 15.70 | 1.38 |

Numerical Embodiment 2

|  | i | Ri | di | Ni | νi |
|---|---|---|---|---|---|
| Dome cover (D) | 1 | 66.2 | 2.00 | 1.492 | 58 |
|  | 2 | 64.2 | 6.40 |  |  |
| Correction lens (C) | 3 | 57.8 | 2.05 | 1.492 | 58 |
|  | 4 | 58.2 | 4.95 |  |  |

Focal length

|  | Wide-angle | Middle | Telephoto | Magnification |
|---|---|---|---|---|
| Main lens alone | 3.40 | 34.67 | 134.48 | 39.55 |
| (Main lens) + (Dome cover) | 3.42 | 34.29 | 113.79 | 33.27 |
| (Main lens) + (Dome cover) + (Correction lens) | 3.47 | 35.38 | 137.06 | 39.50 |

Numerical Embodiment 3

|  | i | Ri | di | Ni | νi |
|---|---|---|---|---|---|
| Dome cover (D) | 1 | 66.2 | 2.00 | 1.585 | 29 |
|  | 2 | 64.2 | 6.40 |  |  |
| Correction lens (C) | 3 | 57.8 | 1.70 | 1.585 | 29 |
|  | 4 | 58.2 | 5.30 |  |  |

Focal length

|  | Wide-angle | Middle | Telephoto | Magnification |
|---|---|---|---|---|
| Main lens alone | 3.40 | 34.67 | 134.48 | 39.55 |
| (Main lens) + (Dome cover) | 3.42 | 34.25 | 112.1 | 32.78 |
| (Main lens) + (Dome cover) + (Correction lens) | 3.48 | 35.40 | 137.58 | 39.53 |

*Main lens data are the same as those of Numerical Embodiment 1

TABLE 3

Numerical Embodiment 4

|  | i | Ri | di | Ni | νi |
|---|---|---|---|---|---|
| Dome cover (D) | 1 | 66.2 | 2.00 | 1.585 | 29 |
|  | 2 | 64.2 | 6.40 |  |  |
| Correction lens (C) | 3* | 57.8 | 2.05 | 1.58313 | 59.4 |
|  | 4 | 58.2 | 4.95 |  |  |

Aspherical Coefficient

|  | k | B | C |
|---|---|---|---|
| 3* | 2.332E−03 | 1.624E−09 | 5.367E−12 |

Focal length

|  | Wide-angle | Middle | Telephoto | Magnification |
|---|---|---|---|---|
| Main lens alone | 3.40 | 34.67 | 134.48 | 39.55 |
| (Main lens) + (Dome cover) | 3.42 | 34.25 | 112.1 | 32.78 |
| (Main lens) + (Dome cover) + (Correction lens) | 3.48 | 35.40 | 137.42 | 39.49 |

*Main lens data are the same as those of Numerical Embodiment 1

TABLE 4

Numerical Embodiment 5

|  | i | Ri | di | Ni | νi |
|---|---|---|---|---|---|
| Dome cover (D) | 1 | 66.2 | 2 | 1.49200 | 58.0 |
|  | 2 | 64.2 | 13.4 |  |  |
| Correction lens (C) | 1' | 66.000 | 2.00 | 1.49200 | 58.0 |
|  | 2' | 64.000 | 2.50 |  |  |
| Main lens | 3 | 93.082 | 1.70 | 1.84666 | 23.8 |
|  | 4 | 37.754 | 5.01 | 1.51633 | 64.1 |
|  | 5 | −1064.850 | 0.20 |  |  |
|  | 6 | 39.488 | 3.58 | 1.51633 | 64.1 |
|  | 7 | 477.037 | 0.20 |  |  |
|  | 8 | 25.639 | 2.83 | 1.69680 | 55.5 |
|  | 9 | 56.001 | (variable) |  |  |
|  | 10 | 50.079 | 0.70 | 2.00060 | 25.5 |
|  | 11 | 5.922 | 3.46 |  |  |
|  | 12 | −19.963 | 0.60 | 1.62299 | 58.2 |
|  | 13 | 7.191 | 2.80 | 1.92286 | 18.9 |
|  | 14 | 43.930 | (variable) |  |  |
|  | 15 | (stop) | 1.07 |  |  |
|  | 16* | 51.417 | 2.70 | 1.58313 | 59.4 |
|  | 17* | −878.094 | (variable) |  |  |
|  | 18* | 15.349 | 2.82 | 1.58313 | 59.4 |
|  | 19* | −48.100 | 0.33 |  |  |

TABLE 4-continued

| | | | | |
|---|---|---|---|---|
| 20 | 238.502 | 0.60 | 1.84666 | 23.8 |
| 21 | 14.264 | 3.52 | 1.60311 | 60.1 |
| 22 | −17.953 | (variable) | | |
| 23 | ∞ | 1.50 | | |
| 24 | ∞ | 1.10 | 1.54400 | 60.0 |
| 25 | ∞ | 0.40 | | |
| 26 | ∞ | 0.70 | 1.49000 | 70.0 |
| 27 | ∞ | | | |

Aspherical Coefficient

| | k | B | C | D | E |
|---|---|---|---|---|---|
| 16* | −8.615E−01 | −1.660E−04 | 0.000E+00 | 0.000E+00 | 0.000E+00 |
| 17* | −7.247E+04 | −1.476E−04 | 8.375E−07 | 0.000E+00 | 0.000E+00 |
| 18* | −1.725E+00 | −1.778E−05 | 9.327E−08 | 6.544E−10 | −1.978E−11 |
| 19* | 1.560E+01 | 6.979E−05 | 0.000E+00 | 0.000E+00 | 0.000E+00 |

TABLE 5

| | Focal length | | |
|---|---|---|---|
| | Wide-angle | Middle | Telephoto |
| (Main lens) + (Dome cover) | 3.42 | 30.37 | 123.00 |
| Main lens alone | 3.40 | 30.66 | 165.67 |
| (Main lens) + (Correction lens) | 3.42 | 30.41 | 123.01 |

| Common (Main lens + Dome) | | | |
|---|---|---|---|
| | Wide-angle | Middle | Telephoto |
| F number | 1.65 | 1.98 | 4.83 |
| Image height | 2.25 | 2.25 | 2.25 |
| d9 | 0.53 | 20.67 | 25.82 |
| d14 | 26.24 | 6.10 | 0.94 |
| d17 | 12.25 | 8.08 | 20.78 |
| d22 | 11.73 | 15.90 | 3.20 |

Numerical Embodiment 6
*Dome cover data are the same as those of Numerical Embodiment 5

| | i | Ri | di | Ni | vi |
|---|---|---|---|---|---|
| Correction lens (C) | 1 | 67.500 | 2.00 | 1.51633 | 64.1 |
| | 2 | 65.500 | 2.50 | | |

*Main lens data are the same as those of Numerical Embodiment 5

| | Focal length | | |
|---|---|---|---|
| | Wide-angle | Middle | Telephoto |
| (Main lens) + (Dome cover) | 3.42 | 30.37 | 123.00 |
| Main lens alone | 3.40 | 30.66 | 165.67 |
| (Main lens) + (Correction lens) | 3.42 | 30.41 | 123.02 |

TABLE 6

| Conditional expression | Numerical Embodiment | | | | | |
|---|---|---|---|---|---|---|
| | 1 | 2 | 3 | 4 | 5 | 6 |
| (1) fdo/fcp | −1.05 | −1.01 | −1.03 | −1.02 | — | — |
| (2) (RD1 − RD2)/(RL1 − RL2) | −5.0 | −5.0 | −5.0 | −5.0 | — | — |
| (3) fcn/OAL | — | — | — | — | −73.15 | −73.21 |
| (4) fcn/√fw * ft | — | — | — | — | −38.65 | −38.68 |
| (5) φrc1/RC1 | — | — | — | — | 0.57 | 0.56 |
| (6) fdo/fcn | — | — | — | — | 1.01 | 1.01 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232224 filed Oct. 6, 2009, which is hereby incorporated by reference herein in its entirety.

What is claimed is:

1. An imaging apparatus comprising:
an imaging system;
a dome cover that houses the imaging system; and
a correction lens between the imaging system and the dome cover,
wherein the following condition is satisfied:

$$-1.10 < fdo/fcp < -0.90,$$

where fdo is the focal length of the dome cover, and fcp is the focal length of the correction lens.

2. The imaging apparatus according to claim 1, wherein the correction lens is a positive meniscus lens convex toward the object side, and the following condition is satisfied:

$$-10.0 < (RD1-RD2)/(RC1-RC2) < -2.0,$$

where RD1 and RD2 are respectively the curvature radii of the object-side and image-plane-side surfaces of the dome cover, and RC1 and RC2 are respectively the curvature radii of the object-side and image-plane-side surfaces of the correction lens.

3. The imaging apparatus according to claim 1, wherein the correction lens and the dome cover are made of identical material.

4. The imaging apparatus according to claim 1, wherein the correction lens has a unit configured to perform selective adjustment of transmission wavelength.

5. The imaging apparatus according to claim 1, wherein at least one surface of the correction lens is aspherical.

* * * * *